United States Patent
Tanaka et al.

(10) Patent No.: US 9,596,342 B2
(45) Date of Patent: Mar. 14, 2017

(54) MOBILE STATION AND MOBILE COMMUNICATION METHOD

(71) Applicant: NTT DOCOMO, INC., Tokyo (JP)

(72) Inventors: Itsuma Tanaka, Tokyo (JP); Aki Ohashi, Tokyo (JP); Hiromi Himeno, Tokyo (JP); Hideyuki Sakuramoto, Tokyo (JP)

(73) Assignee: NTT DOCOMO INC, Tokyo (JP)

( * ) Notice: Subject to any disclaimer, the term of this patent is extended or adjusted under 35 U.S.C. 154(b) by 55 days.

(21) Appl. No.: 14/426,512

(22) PCT Filed: Sep. 5, 2013

(86) PCT No.: PCT/JP2013/073884
§ 371 (c)(1),
(2) Date: Mar. 6, 2015

(87) PCT Pub. No.: WO2014/038614
PCT Pub. Date: Mar. 13, 2014

(65) Prior Publication Data
US 2015/0229758 A1   Aug. 13, 2015

(30) Foreign Application Priority Data
Sep. 7, 2012 (JP) ................. 2012-197017

(51) Int. Cl.
H04M 3/02 (2006.01)
H04M 7/00 (2006.01)
H04W 36/00 (2009.01)

(52) U.S. Cl.
CPC ............ *H04M 3/02* (2013.01); *H04M 7/006* (2013.01); *H04W 36/0022* (2013.01); *H04M 2207/18* (2013.01)

(58) Field of Classification Search
None
See application file for complete search history.

(56) References Cited

U.S. PATENT DOCUMENTS 9,155,003 B2 * 10/2015 Mutikainen ........... H04W 36/14
9,338,625 B2 * 5/2016 Abtin .................. H04L 65/1069
(Continued)

FOREIGN PATENT DOCUMENTS

CN      102056249 A    5/2011
JP      2008-199475 A  8/2008
(Continued)

OTHER PUBLICATIONS

"Voice and Video Calling Over LTE", Uen 284 23-3160 Rev B, Ericsson White Paper, Nov. 2014.*
International Search Report issued in PCT/JP2013/073884 mailed on Nov. 5, 2013 (2 pages).
Written Opinion of the International Searching Authority issued in PCT/JP2013/073884 mailed on Nov. 5, 2013 (4 pages).
(Continued)

*Primary Examiner* — Ayaz Sheikh
*Assistant Examiner* — Faiyazkhan Ghafoerkhan
(74) *Attorney, Agent, or Firm* — Osha Liang LLP

(57) ABSTRACT

A mobile station and a mobile communication method are provided, which are, if being able to output a local ringing tone and a NW-provided ringing tone, capable of continuing a ringing tone outputted before a transition from LTE to 3G by aSRVCC even after the transition is made. A UE (100A) executes continuation processing (aSRVCC) of a 3G voice communication service if the mobile station makes a transition of the connection destination from LTE to 3G during an alert period when the other party in the voice communication service is being alerted. Further, the UE (100A) outputs a NW-provided ringing tone without outputting a local ringing tone based on data stored in the mobile station after making a transition to a second radio access system if aSRVCC is executed during a period when the NW-provided ringing tone is being outputted.

10 Claims, 5 Drawing Sheets

(56) References Cited

U.S. PATENT DOCUMENTS

| | | | |
|---|---|---|---|
| 2009/0147754 A1* | 6/2009 | Long | H04M 7/123 370/331 |
| 2012/0014356 A1* | 1/2012 | Mutikainen | H04W 36/14 370/331 |
| 2012/0127960 A1* | 5/2012 | Lei | H04W 36/0022 370/332 |
| 2012/0213202 A1* | 8/2012 | Li | H04M 3/42017 370/331 |
| 2013/0028179 A1* | 1/2013 | Sedlacek | H04L 65/1073 370/328 |
| 2013/0143565 A1* | 6/2013 | Zisimopoulos | H04W 36/14 455/436 |
| 2014/0219241 A1* | 8/2014 | Parron | H04W 36/0022 370/331 |
| 2014/0370842 A1* | 12/2014 | Abtin | H04L 65/1069 455/404.2 |
| 2015/0079992 A1* | 3/2015 | Kaura | H04W 68/005 455/436 |
| 2015/0373591 A1* | 12/2015 | Mutikainen | H04W 36/14 370/331 |
| 2015/0382250 A1* | 12/2015 | Speks | H04L 65/1016 455/436 |
| 2015/0382251 A1* | 12/2015 | Wang | H04W 36/0022 455/439 |

FOREIGN PATENT DOCUMENTS

| | | |
|---|---|---|
| WO | 2010/109269 A1 | 9/2010 |
| WO | 2013/141591 A1 | 9/2013 |

OTHER PUBLICATIONS

Camarillo, G. et al.; "Early Media and Ringing Tone Generation in the Session Initiation Protocol (SIP)"; IETF, RFC3960, Dec. 2004 (13 pages).

ZTE; "Discussion on inter-working between SRVCC in altering phase and CAT"; 3GPP TSG SA WG2 Meeting #77, TD S2-100499; Shenzhen, China; Jan. 18-22, 2010 (3 pages).

3GPP TS 24.182 V10.3.0; "3rd Generation Partnership Project; Technical Specification Group Core Network and Terminals; IP Multimedia Subsystem (IMS) Customized Alerting Tones (CAT); Protocol specification (Release 10)"; Jun. 2011 (141 pages).

3GPP TS 24.237 V11.3.0; "3rd Generation Partnership Project; Technical Specification Group Core Network and Terminals; IP Multimedia (IM) Core Network (CN) subsystem IP Multimedia Subsystem (IMS) Service Continuity: Stage 3 (Release 11)"; Jun. 2012 (341 pages).

3GPP TS 24.008 V11.3.0; "3rd Generation Partnership Project; Technical Specification Group Core Network and Terminals; Mobile radio interface Layer 3 specification; Core network protocols; Stage 3 (Release 11)"; Jun. 2012 (670 pages).

Japanese Office Action w/translation for corresponding Japanese Application No. 2012-197017 mailed Nov. 5, 2013 (8 pages).

Extended European Search Report in counterpart European Application No. 13 83 5513.6 issued Mar. 8, 2016 (6 pages).

ZTE; "Enhancement to SCC AS—SRVCC and CAT IWK"; 3GPP TSG SA WG2 Meeting #77, S2-100500; Shenzhen, China; Jan. 18-22, 2010 (5 pages).

First Office Action issued May 17, 2016, in corresponding Chinese Patent Application No. 201380046540.7 (with translation) (19 pages).

* cited by examiner

MOBILE STATION AND MOBILE COMMUNICATION METHOD

TECHNICAL FIELD

The present invention relates to a mobile station and a mobile communication method for executing a transition from a first radio access system with no circuit-switched domain to a second radio access system with a circuit-switched domain. More particularly, the present invention relates to a mobile station and a mobile communication method capable of outputting a local ringing tone and a NW-provided ringing tone.

BACKGROUND ART

According to technical standard specifications of a mobile communication system specified by 3rd Generation Partnership Project (3GPP), a local ringing tone to be outputted based on data stored in a call-originating terminal (mobile station) and a NW-provided ringing tone to be transmitted to the call-originating terminal from a network are specified as ringing tones to be outputted to a user during alerting of a call-terminating terminal. Also, a CAT (Customized Alerting Tone) using the user's favorite music or the like as the ringing tone is specified as one of the NW-provided ringing tones (e.g., Non-patent document 1).

The local ringing tone is outputted from a speaker or the like, based on the data stored in the call-originating terminal (mobile station). On the other hand, as to the NW-provided ringing tone, a ringing tone (RBT/CAT) transmitted as Early Media (specified in IETF RFC 3960 or the like) to the call-originating terminal from the network is outputted from the speaker. To be more specific, the NW-provided ringing tone is outputted at a time when "180 Ringing" according to Session Initiation Protocol (SIP) is transmitted to the call-originating terminal from the call-terminating terminal.

Moreover, in the 3GPP technical standard specifications, SRVCC (single Radio Voice Call Continuity) is specified, which allows a mobile station executing voice communication via Long Term Evolution (LTE) with no circuit-switched domain to make a transition to a 3G (W-CDMA) circuit-switched domain while continuing the voice communication (e.g., Non-patent document 2). As a type of the SRVCC, aSRVCC (SRVCC in alerting phase) is also specified, which enables a transition from LTE to 3G during alerting of the call-terminating terminal. The aSRVCC realizes the transition from LTE to 3G while maintaining the alerting even during the alerting of the call-terminating terminal.

PRIOR ART DOCUMENT

Non-Patent Document

Non-patent document 1: 3GPP TS 24.182 V10.3.0 Subclause 4.5 "Signaling procedures", 3rd Generation Partnership Project; Technical Specification Group Core Network and Terminals; IP Multimedia Subsystem (IMS) Customized Alerting Tones (CAT); Protocol specification (Release 10), 3GPP, June 2011

Non-patent document 2: 3GPP TS 24.237 V11.3.0 Subclause 12 "Roles for PS-CS session continuity, Single Radio", 3rd Generation Partnership Project; Technical Specification Group Core Network and Terminals; IP Multimedia (IM) Core Network (CN) subsystem IP Multimedia Subsystem (IMS) Service Continuity; Stage 3 (Release 11), 3GPP, June 2012

SUMMARY OF THE INVENTION

However, the conventional local ringing tone, NW-provided ringing tone and aSRVCC described above have the following problem. Specifically, when a mobile station connected to LTE makes a transition to 3G by aSRVCC, the mobile station cannot determine which one of the local ringing tone and the NW-provided ringing tone should be outputted after the transition to 3G, because the mobile station does not know which one of the local ringing tone and the NW-provided ringing tone is outputted before the transition.

For this reason, if the mobile station makes a transition from LTE to 3G by aSRVCC while outputting, for example, the CAT received as Early Media from the network, the mobile station outputs a normal ringing tone (local ringing tone). In this case, there is a concern that such switching from the CAT to the normal ringing tone (e.g., a ringing tone similar to an incoming call alert) may give the user a sense of discomfort. There is another case where time is set aside for the mobile station to check whether or not to receive a CAT after a transition to 3G by aSRVCC, if the mobile station makes the transition while outputting the normal ringing tone (local ringing tone). In this case, the user may experience a sense of discomfort because the ringing tone suddenly falls off into silence.

The present invention was made in consideration of the foregoing circumstances. It is an objective of the present invention to provide a mobile station and a mobile communication method which are, if being able to output a local ringing tone and a NW-provided ringing tone, capable of continuing a ringing tone outputted before a transition from LTE to 3G even after the transition is made.

A first feature of the present invention is summarized as a mobile station capable of providing a voice communication service via an IP multimedia subsystem and configured to execute a transition from a first radio access system with no circuit-switched domain to a second radio access system with a circuit-switched domain, including: a voice communication control unit configured to execute continuation processing of the voice communication service in the second radio access system if the mobile station makes a transition of a connection destination from the first radio access system to the second radio access system during an alert period when the other party in the voice communication service is being alerted; and a ringing tone control unit configured to output a NW-provided ringing tone or a local ringing tone during the alert period, the NW-provided ringing tone being transmitted from a network via the first radio access system or the second radio access system during the alert period, the local ringing tone being based on data stored in the mobile station. Here, the ringing tone control unit outputs the NW-provided ringing tone without outputting the local ringing tone based on the data stored in the mobile station after a transition to the second radio access system if the voice communication control unit executes the continuation processing of the voice communication service during a period when the NW-provided ringing tone is being outputted.

A second feature of the present invention is summarized as a mobile station capable of providing a voice communication service via an IP multimedia subsystem and configured to execute a transition from a first radio access system with no circuit-switched domain to a second radio access system with a circuit-switched domain, including: a voice communication control unit configured to execute continuation processing of the voice communication service in the second radio access system if the mobile station makes a transition of a connection destination from the first radio access system to the second radio access system during an alert period when the other party in the voice communication, service is being alerted; and a ringing tone control unit configured to output a NW-provided ringing tone or a local ringing tone during the alert period, the NW-provided ringing tone being transmitted from the network via the first radio access system or the second radio access system during the alert period, the local ringing tone being based on data stored in the mobile station. Here, the ringing tone control unit outputs the local ringing tone without outputting the NW-provided ringing tone even after the transition to the second radio access system if the voice communication control unit executes the continuation processing of the voice communication service during a period when the local ringing tone is being outputted without the NW-provided ringing tone outputted.

A third feature of the present invention is summarized as a mobile communication method for executing a transition of a mobile station from a first radio access system with no circuit-switched domain to a second radio access system with a circuit-switched domain, the method being capable of providing a voice communication service via an IP multimedia subsystem, including the steps of: executing continuation processing of the voice communication service in the second radio access system if the mobile station makes a transition of a connection destination from the first radio access system to the second radio access system during an alert period when the other party in the voice communication service is being alerted; and outputting a NW-provided ringing tone or a local ringing tone during the alert period, the NW-provided ringing tone being transmitted from the network via the first radio access system or the second radio access system during the alert period, the local ringing tone being based on data stored in the mobile station. Here, the outputting step includes outputting the NW-provided ringing tone without outputting the local ringing tone based on the data stored in the mobile station after a transition to the second radio access system if the continuation processing of the voice communication service is executed during a period when the NW-provided ringing tone is being outputted.

A fourth feature of the present invention is summarized as a mobile communication method for executing a transition of a mobile station from a first radio access system with no circuit-switched domain to a second radio access system with a circuit-switched domain, the method being capable of providing a voice communication service via an IP multimedia subsystem, including the steps of: executing continuation processing of the voice communication service in the second radio access system if the mobile station makes a transition of a connection destination from the first radio access system to the second radio access system during an alert period when the other party in the voice communication service is being alerted; and outputting a NW-provided ringing tone or a local ringing tone during the alert period, the NW-provided ringing tone being transmitted from the network via the first radio access system or the second radio access system during the alert period and the local ringing tone being based on data stored in the mobile station. Here, the outputting step includes outputting the local ringing tone without outputting the NW-provided ringing tone even after a transition to the second radio access system if the continuation processing of the voice communication service is executed during a period when the local ringing tone is being outputted without the NW-provided ringing tone outputted.

MODE FOR CARRYING OUT THE INVENTION

Next, an embodiment of the present invention will be described. Note that, in the following description of the drawings, same or similar reference signs denote same or similar elements and portions. In addition, it should be noted that the drawings are schematic and ratios of dimensions and the like are different from actual ones.

Therefore, specific dimensions and the like should be determined in consideration of the following description. Moreover, the drawings also include portions having different dimensional relationships and ratios from each other.

(1) Overall Schematic Configuration of Mobile Communication System

Figure 1:
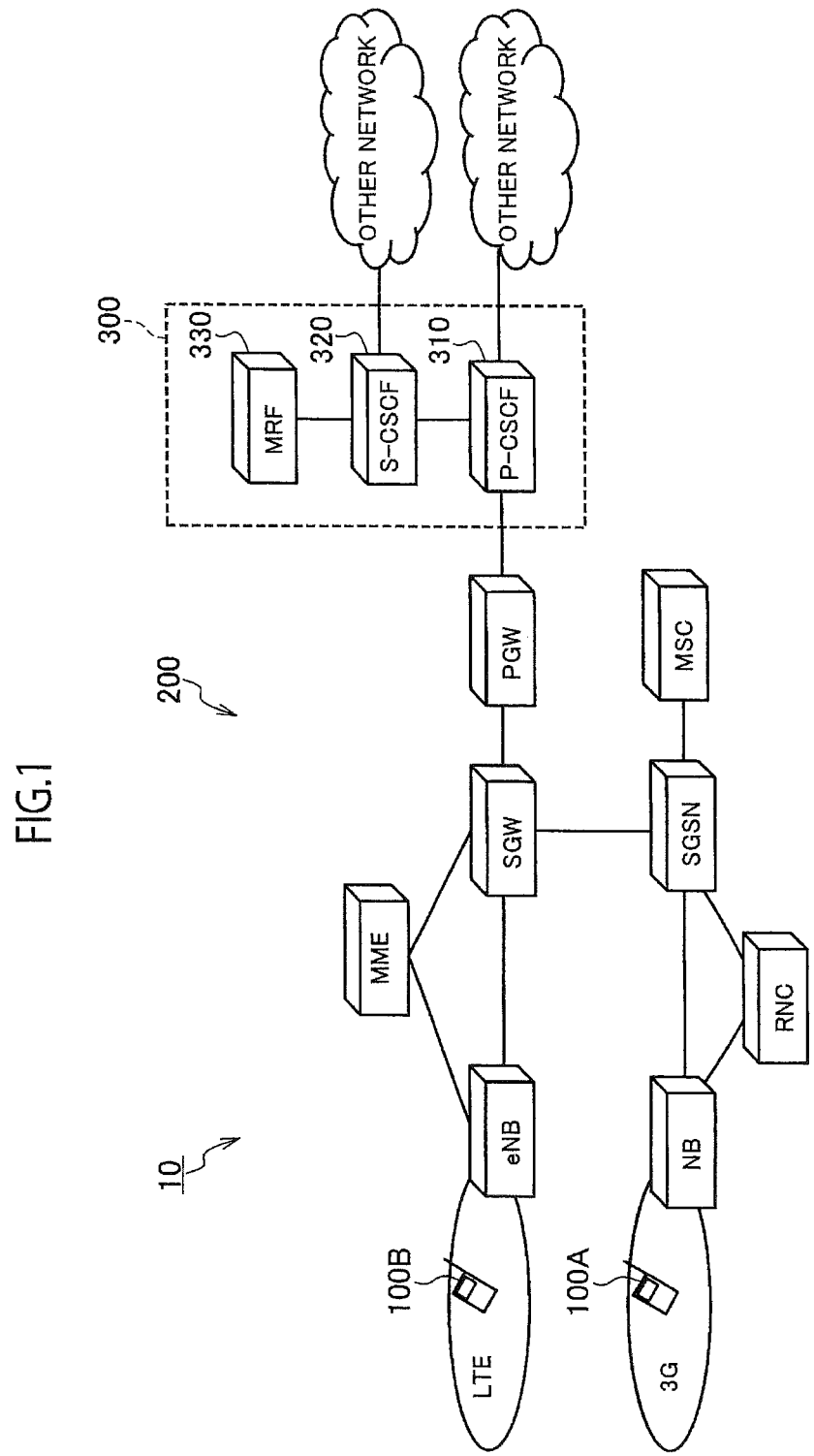
FIG. 1 is an overall schematic configuration diagram of a mobile communication system 10 according to an embodiment of the present invention.
Figure 3:
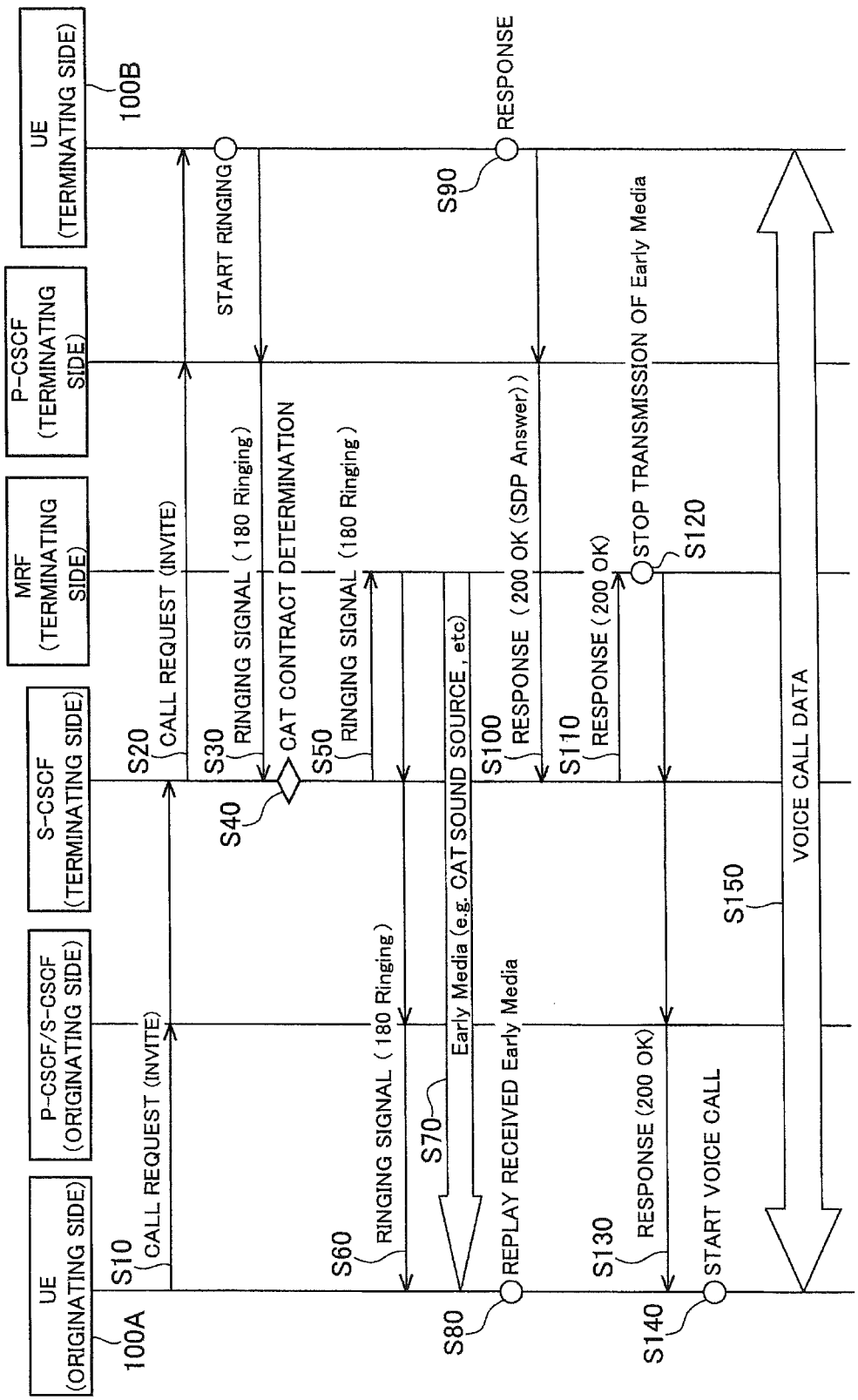
FIG. 3 is a sequence diagram schematically showing call origination accompanied by CAT reception according to the embodiment of the present invention.

FIG. 1 is an overall schematic configuration diagram of a mobile communication system 10 according to this embodiment. As shown in FIG. 3, the mobile communication system. 10 includes mobile stations 100A and 100B (hereinafter the UEs 100A and 100B), an IP-Connectivity Access Network 200 (hereinafter the IP-CAN 200) and an IP Multimedia core network Subsystem 300 (hereinafter the IMS 300). In this embodiment, the UE 100A can execute radio communication according to Long Term Evolution (LTE) and 3G (W-CDMA). The UEs 100A and 100B can connect to the IP-CAN 200 according to LTE or 3G. Also, the UEs 100A and 100B can provide a voice communication service via the IMS 300 (IP multimedia subsystem), and can execute a transition from LTE (first radio access system) with no circuit-switched domain to 3G (second radio access system) with a circuit-switched domain.

The IP-CAN 200 is an access network according to an Internet protocol (IP). To be more specific, the IP-CAN 200 is a network that provides a transport function of a Session Initiation Protocol (SIP) and voice media, and corresponds to an LTE/Evolved Packet Core (EPC) network in this embodiment.

The IP-CAN 200 includes a Mobility Management Entity (MME), a Serving Gateway (SGW), a Packet Data Network Gateway (PGW) and an SGSN (Serving GPRS Support Node).

The MME is an exchange that accommodates an eNB (LTE radio base station) and provides functions of mobility control, bearer control, and the like. The SGW is a visited packet exchange which accommodates a 3GPP (LTE) access system. The PGW is a connection point with the IMS base, and is a packet exchange that performs IP address assignment, packet transfer to the SGW, and the like. Also, the PGW works with a PCRF to execute QoS control, bearer setting control, and the like. The SGSN is a packet exchange which accommodates a UTRAN (3G) access system. An MSC is an exchange for a voice communication call in 3G. An RNC controls an NB (3G radio base station).

The IMS 300 is a multimedia subsystem according to an Internet protocol, and includes a Proxy-Call Session Control Function 310 (hereinafter the P-CSCF 310), a Serving-Call Session Control Function (hereinafter the S-CSCF 320) and a Multimedia Resource Function (hereinafter the MRF 330).

The P-CSCF and the S-CSCF are SIP relay servers to execute SIP transfer, and the like. Moreover, other networks (such as a fixed telephone network) are connected to the IMS 300.

(2) Functional Block Configuration of Mobile Station

Figure 2:
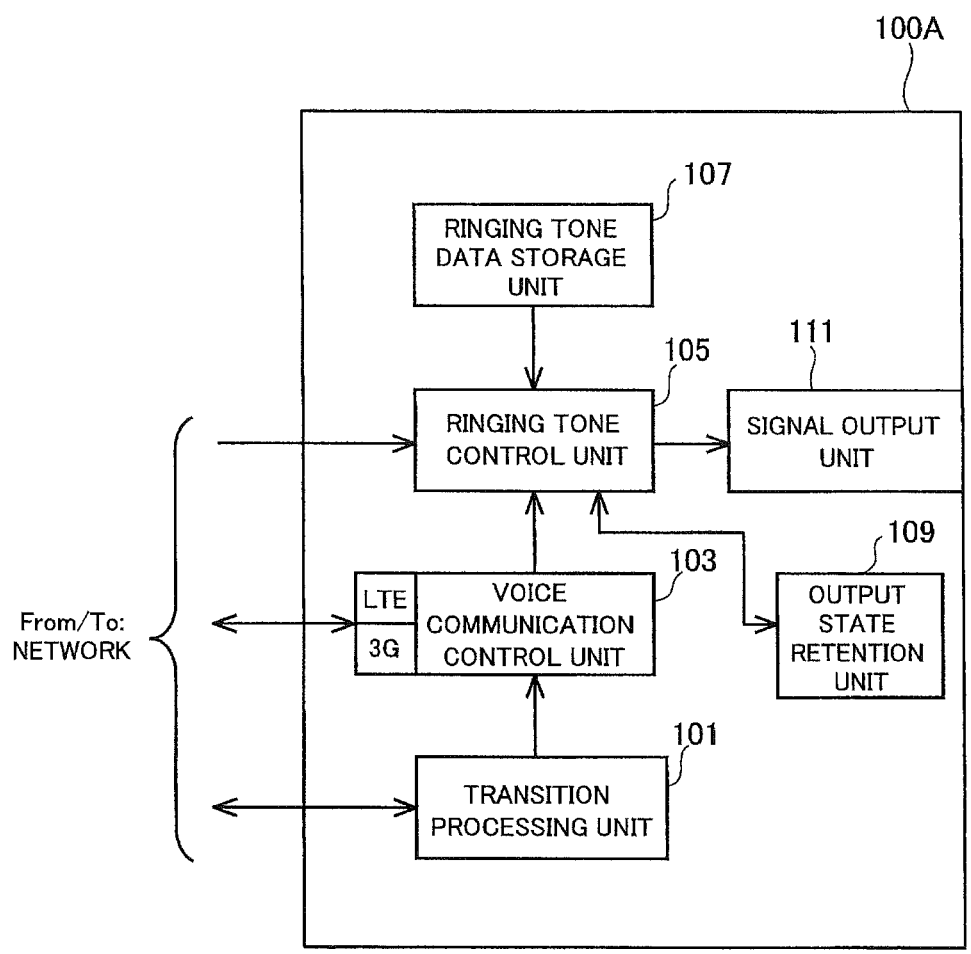
FIG. 2 is a functional block configuration diagram of a UE 100A according to the embodiment of the present invention.

FIG. 2 is a functional block configuration diagram of the UE 100A. As shown in FIG. 2, the UE 100A includes a transition processing unit 101, a voice communication control unit 103, a ringing tone control unit 105, a ringing tone data storage unit 107, an output state retention unit 109, and a signal output unit 111. Note that the UE 100B also has the same functional block configuration as that of the UE 100A.

The transition processing unit 101 executes processing on a transition of the UE 100A from LTE to 3G or from 3G to LTE. To be more specific, the transition processing unit 101 executes processing on a transition (such as HANDOVER and REDIRECTION) between LTE and 3G according to a state of a radio signal to be received by the UE 100A, and the like.

The voice communication control unit 103 executes control of voice communication to be provided by the UE 100A. To be more specific, the voice communication control unit 103 provides SRVCC (Single Radio Voice Call Continuity) to allow the UE 100A executing voice communication via LTE to make a transition to a 3G circuit-switched domain while continuing the voice communication, based on the decision on the transition by the transition processing unit 101. Moreover, as described later, the transition processing unit 101 and the voice communication control unit 103 provide functions of AS, 3G and LTE (see FIG. 4).

Particularly, in this embodiment, aSRVCC is provided to execute continuation processing of a 3G voice communication service (e.g., a voice call) if the UE 100A makes a transition of the connection destination from LTE to 3G during an alert period when the other party (e.g., the UE 100B) in the voice communication service via the IMS 300 is being alerted. To be more specific, the voice communication control unit 103 causes the UE 100A to make a transition to 3G, the UE 100A being in a state of having the call not connected yet (more specifically, no "200 OK" received) even after receiving "180 Ringing" that is an SIP message indicating that alerting of the other party in the voice communication service, i.e., a call-terminating terminal is started.

The ringing tone control unit 105 controls a ringing tone to be outputted from the signal output unit 111. In this embodiment, during an alert period of the call-terminating terminal, the ringing tone control unit 105 causes the signal output unit 111 to output a NW-provided ringing tone (such as RBT/CAT (Customized Alerting Tone) provided as Early Media) transmitted from a network via LTE or 3G during the alert period or a local ringing tone (e.g., the same ringing tone as a normal incoming call alert) based on data held by the UE 100A.

To be more specific, when aSRVCC is executed, the ringing tone control unit 105 outputs the NW-provided ringing tone or the local ringing tone after a transition to 3G based on an output state of a ringing tone retained by the output state retention unit 109.

For example, if the voice communication control unit 103 executes the continuation processing (aSRVCC) of the voice communication service during a period when the NW-provided ringing tone is being outputted, the ringing tone control unit 105 causes the signal output unit 111 to output the NW-provided ringing tone without outputting the local ringing tone based on the data stored in the UE 100A after the transition to 3G.

On the other hand, if the voice communication control unit 103 executes the continuation processing of the voice communication service during a period when the local ringing tone is outputted without the NW-provided ringing tone outputted, the ringing tone control unit 105 causes the signal output unit 111 to output the local ringing tone without outputting the NW-provided ringing tone even after the transition to 3G.

To be more specific, if the voice communication control unit 103 executes the continuation processing of the voice communication service during a period when the CAT is being outputted from the signal output unit 111, the ringing tone control unit 105 establishes a voice communication path (path) via 3G. More specifically, as specified in 3GPP TS24.008 Subclause 5.2.4.3 and 5.5.1, User connection attach is executed in a call delivered state. Such processing enables in-band tones/announcement to be received via 3G.

The ringing tone control unit 105 controls the signal output unit 111 to output the NW-provided ringing tone received through the established voice communication path. Note that the ringing tone control unit 105 can receive in-band tones/announcement including at least any of normal incoming call alert, music, voice data and audio guidance. Note that the normal incoming call alert means repeated output of tone signals with a predetermined period, such as a tone outputted by a conventional exchange on a call-terminating side.

The ringing tone data storage unit 107 stores ringing tone data used to generate and output the local ringing tone. The ringing tone may be the normal incoming call alert described above, music or voice data (e.g., a part of a famous phrase) generated based on a data file downloaded beforehand from a network, audio guidance (e.g., information on the other party user), or the like. However, the ringing tone differs from the NW-provided ringing tone (such as the CAT) in being downloaded beforehand and stored in the ringing tone data storage unit 107.

The output state retention unit 109 retains the output state indicating which one of the NW-provided ringing tone and the local ringing tone is outputted. To be more specific, the output state retention unit 109 retains the output state based on a flag (data transmission information) indicating that the NW-provided ringing tone is transmitted from the network. When the flag is notified from the network via LTE, the output state retention unit 109 retains output of the NW-provided ringing tone as the output state. On the other hand, when the flag is not notified, the output state retention unit 109 retains output of the local ringing tone as the output state. Note that the flag can be included in a message (180 Ringing) according to SIP to be described later.

Moreover, the output state retention unit 109 may also determine which one of the NW-provided ringing tone and the local ringing tone is outputted by the ringing tone control unit 105. To be more specific, the output state retention unit 109 acquires information indicating which one of the NW-provided ringing tone and the local ringing tone is outputted from the ringing tone control unit 105 or monitors the state of the ringing tone control unit 105, thereby determining which one of the NW-provided ringing tone and the local ringing tone is outputted by the ringing tone control unit 105. The output state retention unit 109 retains the output state of the ringing tone based on the determination result thus obtained.

The signal output unit 111 outputs a ringing tone signal based on the control by the ringing tone control unit 105. To be more specific, the signal output unit 111 can be configured using a speaker to output a signal in an audible frequency range or a terminal and an interface (Bluetooth (registered trademark)) to output an analog or digital signal of the ringing tone.

(3) Operations of Mobile Communication System

Next, description is given of operations of the mobile communication system 10 described above. More specifically, description is given of a call sequence accompanied by CAT reception, a transition sequence from LTE to 3G by aSRVCC, and an operation flow of the mobile stations (UEs 100A and 100B).

(3.1) Call Sequence Accompanied by CAT Reception

FIG. 3 shows a schematic call sequence accompanied by CAT reception. Note that the sequence shown in FIG. 3 is a general call sequence accompanied by conventional CAT reception.

As shown in FIG. 3, the UE 100A (originating side) transmits a call request (specifically, SIP INVITE), and the call request is relayed to the UE 100B (terminating side) (S10 and S20). Once the call request is relayed to the UE 100B, alerting of the UE 100B is started, and an alerting signal (180 Ringing) is relayed from the UE 100B to the S-CSCF 320 (terminating side) (S30).

The S-CSCF 320 determines whether or not the UE 100B has a contract to use the CAT, and relays the alerting signal to the MRF 330 (S40 and S50). Note that, here, the UE 100B is assumed to have a contract to use the CAT.

The MRF 330 transmits the alerting signal to the UE 100A through the S-CSCF 320, and also transmits Early Media to the UE 100A through an established User connection (S60 and S70). The UE 100A outputs the received CAT (S80).

Meanwhile, upon responding to the call, the UE 100B transmits a message (200 OK (SDP Answer)) indicating such a response to the S-CSCF 320 (S90 and S100). The response (200 OK) is relayed to the MRF 330, and the MRF 330 stops the transmission of Early Media (S110 and S120). Also, the MRF 330 transmits the response (200 OK) to the UE 100A through the S-CSCF 320 (S130).

The UE 100A starts a voice communication service (VOICE CALL) based on the received response (200 OK), and thus VOICE CALL data is transmitted and received between the UE 100A and the UE 100B (S140 and S150).

(3.2) Transition Sequence from LTE to 3G by aSRVCC

Figure 4:
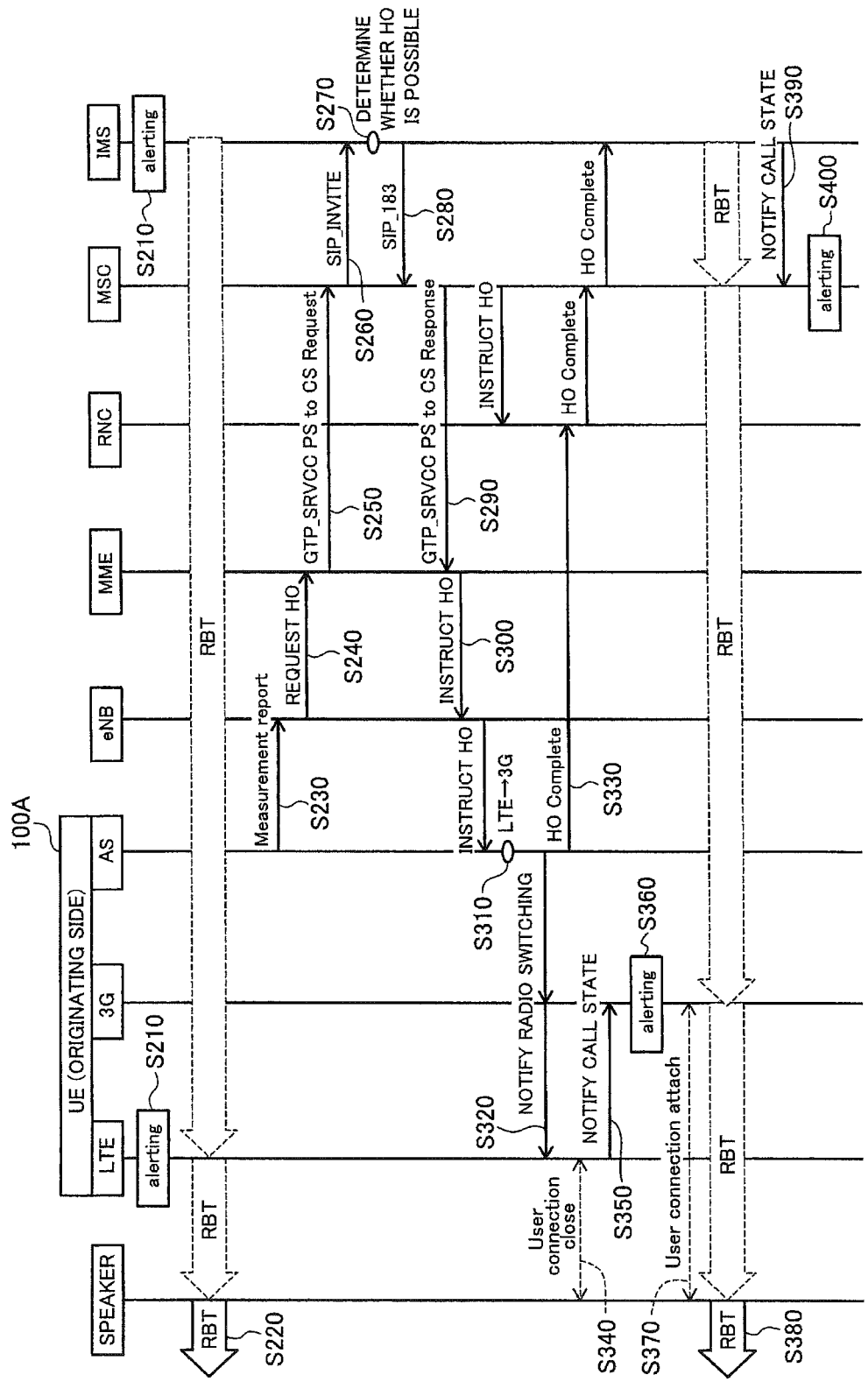
FIG. 4 is a sequence diagram showing communication based on a call-originating terminal (mobile station) in the case of a transition from LTE to 3G by aSRVCC according to the embodiment of the present invention.

FIG. 4 shows a sequence diagram showing communication based on a call-originating terminal (mobile station) in the case of a transition from LTE to 3G by aSRVCC.

As shown in FIG. 4, the UE 100A (originating side) includes AS (Access Stratum), 3G and LTE functional blocks. Once the UE 100A initiates a call to the call-terminating terminal UE 100B, the UE 100A turns into an alerting (Alerting) state, and the IMS 300 recognizes that the state of the UE 100A is the Alerting state as well (S210).

When the alerting of the UE 100B is started, specifically, when the UE 100A receives 180 Ringing, the UE 100A receives the NW-provided ringing tone (such as RBT/CAT) from the network (IMS 300) and outputs the NW-provided ringing tone (S220).

When the AS block transmits Measurement report to the eNB in the state where the UE 100A is alerting the UE 100B, the eNB requests the MME for handover (HO) from LTE to 3G based on the content of Measurement report (S230 and S240). Upon request of the eNB, the MME requests for a transition to 3G by SRVCC (GTP_SRVCC PS to CS Request) (S250), and the handover processing is executed among the RNC, MSC and IMS 300 (S260 to S280). Thereafter, the MME receives a response concerning the result of the processing (GTP_SRVCC PS to CS Response) from the MSC, and instructs the eNB to perform handover (S290 and S300).

The AS block in the UE 100A determines to execute switching from LTE to 3G based on the handover instruction from the eNB, and then notifies the LTE in the UE 100A of radio switching (S310 and S320). The AS in the UE 100A also notifies the network of the completion of the handover (HO Complete) (S330).

The LTE block in the UE 100A notified of the switching terminates the User connection established with the speaker (the signal output unit 111), and notifies the 3G block in the UE 100A of a call state (S340 and S350). Here, the "call state" notified from the LTE block to the 3G block in the UE 100A also includes the output state of the ringing tone.

The 3G block in the UE 100A continues the alerting of the call-terminating terminal (UE 100B) based on the notified call state, and establishes User connection with the speaker (S360 and S370). Once the alerting of the UE 100B is started on the 3G side, the NW-provided ringing tone is received and outputted from the network (IMS 300) (S380). Then, the call state of the UE 100A is similarly notified from the IMS 300 to the MSC, and the state of the UE 100A is recognized as Alerting state also in the MSC (S400).

(3.3) Operation Flow of Mobile Station

Figure 5:
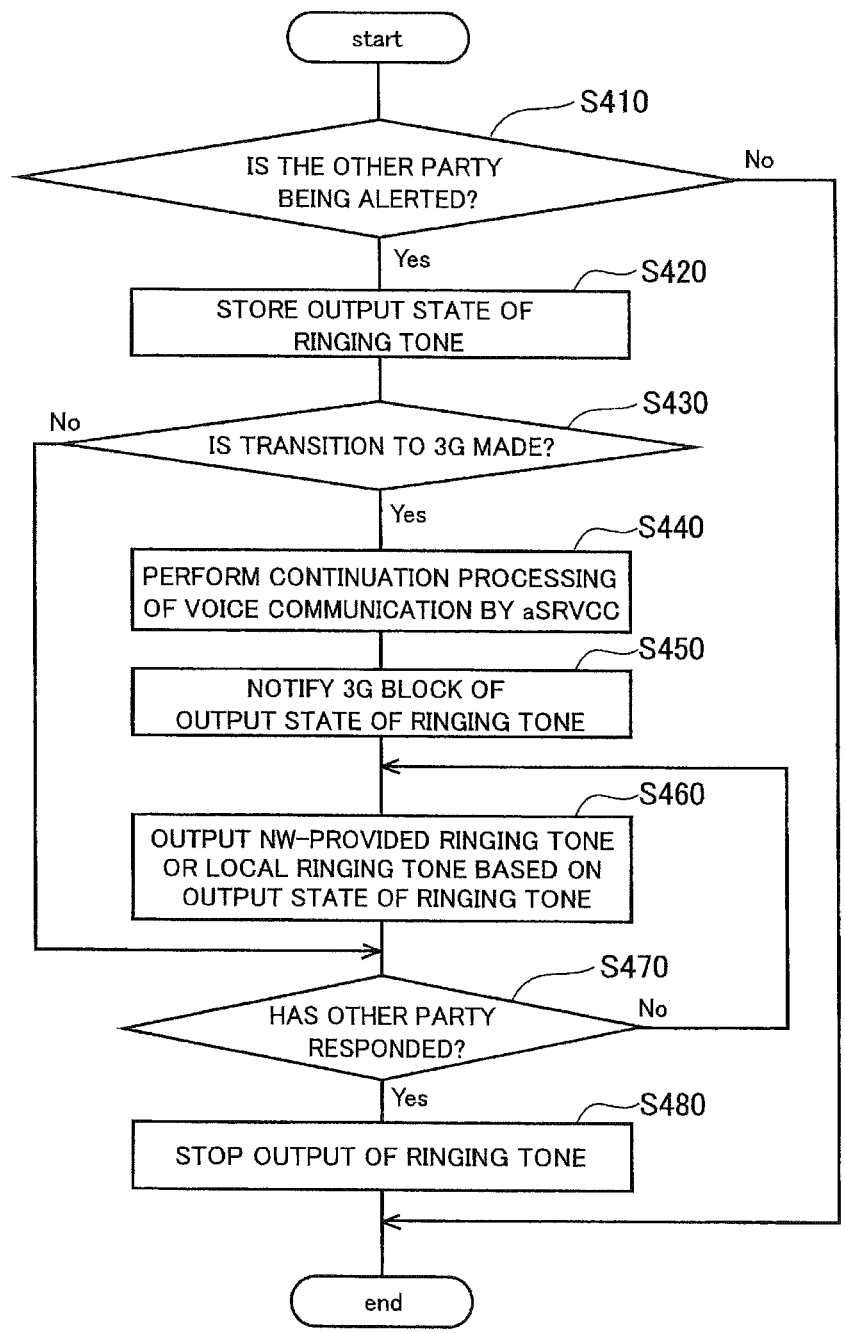
FIG. 5 is a flowchart showing an operation of outputting a ringing tone during transition of the UE 100A from LTE to 3G according to the embodiment of the present invention.

FIG. 5 shows an operation flow of the mobile station (UE 100A). Specifically, FIG. 5 shows an operation flow of outputting a ringing tone during transition of the UE 100A from LTE to 3G.

As shown in FIG. 5, the UE 100A determines whether or not the other party (the call-terminating terminal) is being alerted (S410). To be more specific, the UE 100A determines whether or not "200 OK" is received after SIP "180 Ringing" has been received.

If the other party is being alerted, the UE 100A stores the output state of the ringing tone (S420). To be more specific, the UE 100A stores which one of the NW-provided ringing tone (such as the CAT) and the local ringing tone is being outputted.

Next, the UE 100A determines whether or not a transition is made from LTE to 3G during a period (alert period) when such a ringing tone is being outputted (S430). For example, the UE 100A determines whether the terminal has received the HO instruction (S300 in FIG. 4) from the NW and the HO has been completed from LTE to 3G. When no transition is made from LTE to 3G, the UE 100A outputs the ringing tone (the NW-provided ringing tone or the local ringing tone) until the other party responds (S470 and S480).

When the transition is made from LTE to 3G, the UE 100A executes the continuation processing of the voice communication by aSRVCC (specifically, continuation processing during alerting) as described above (S440). Also, the UE 100A notifies the output state of the ringing tone stored in Step S420 from the LTE side to the 3G side. To be more specific, the output state is notified from the LTE block to the 3G block in the UE 100A.

The UE 100A (the 3G block) outputs the ringing tone (the NW-provided ringing tone or the local ringing tone) based on the output state of the ringing tone (S460).

The UE 100A determines whether or not the other party (UE 100B) under alerting has responded (S470). To be more specific, the UE 100A determines whether or not "CONNECT" or "200 OK" has been received from the network side. If the other party under alerting has responded, the UE 100A stops the output of the ringing tone (S480). Thereafter, the UE 100A starts the voice communication service (such as a voice call) with the other party.

(4) Advantageous Effects

According to the UE 100A (UE 100B), if aSRVCC is executed during a period when the NW-provided ringing tone is being outputted, the NW-provided ringing tone is outputted without the local ringing tone outputted after transition from LTE to 3G. Alternatively, if aSRVCC is executed during a period when the local ringing tone is being outputted without the NW-provided ringing tone outputted, the local ringing tone is outputted without the NW-provided ringing tone outputted even after transition from LTE to 3G. To be more specific, if a SRVCC is executed, the NW-provided ringing tone or the local ringing tone is outputted after transition to 3G, based on the output state of the ringing tone retained by the UE 100A (the output state retention unit 109).

Thus, even if a transition is made from LTE to 3G while the other party is being alerted, a situation can be avoided where the ringing tone is suddenly changed or where the ringing tone being outputted suddenly falls off into silence, thus giving no sense of discomfort to the user.

(5) Other Embodiment

As described above, the details of the present invention have been disclosed by using the embodiments of the present invention. However, it should not be understood that the description and drawings which constitute part of this disclosure limit the present invention. From this disclosure, various alternative embodiments, examples, and operation techniques will be easily found by those skilled in the art.

For example, in the above embodiment of the present invention, the description is given of the example where the CAT (Call Alerting Tone) based on Early Media is used as the NW-provided ringing tone. However, the NW-provided ringing tone is not limited to the CAT but may be the normal incoming call alert as long as the NW-provided ringing tone is based on the data transmitted from the network during the alert period.

Moreover, in the above embodiment, the description is given of LTE and 3G as an example. However, the present invention is not limited to LTE or 3G as long as the voice communication service can be provided via the IP multimedia subsystem and a transition can be made between a first radio access system with no circuit-switched domain and a second radio access system with a circuit-switched domain.

The features of the present invention may also be expressed as follows. A first feature of the present invention is summarized as a UE 100A/100B (mobile station) capable of providing a voice communication service via IMS 300 (IP multimedia subsystem) and configured to execute a transition from LTE (first radio access system) with no circuit-switched domain to 3G (second radio access system) with a circuit-switched domain, including: a voice communication control unit 103 (voice communication control unit) configured to execute aSRVCC (continuation processing of the voice communication service in the second radio access system) if the mobile station makes a transition of a connection destination from the first radio access system to the second radio access system during an alert period when the other party in the voice communication service is being alerted; and a ringing tone control unit 105 (ringing tone control unit) configured to output a NW-provided ringing tone or a local ringing tone during the alert period, the NW-provided ringing tone being transmitted from a network via the first radio access system or the second radio access system during the alert period, the local ringing tone being based on data stored in the mobile station. Here, the ringing tone control unit outputs the NW-provided ringing tone without outputting the local ringing tone based on the data stored in the mobile station after a transition to the second radio access system if the voice communication control unit executes the continuation processing of the voice communication service during a period when the NW-provided ringing tone is being outputted.

A second feature of the present invention is summarized as a UE 100A/100B (mobile station) capable of providing a voice communication service via IMS 300 (IP multimedia subsystem) and configured to execute a transition from LTE (first radio access system) with no circuit-switched domain to 3G (second radio access system) with a circuit-switched domain, including: a voice communication control unit 103 (voice communication control unit) configured to execute continuation processing of the voice communication service in the second radio access system if the mobile station makes a transition of a connection destination from the first radio access system to the second radio access system during an alert period when the other party in the voice communication service is being alerted; and a ringing tone control unit 105 (ringing tone control unit) configured to output a NW-provided ringing tone or a local ringing tone during the alert period, the NW-provided ringing tone being transmitted from the network via the first radio access system or the second radio access system during the alert period, the local ringing tone being based on, data stored in the mobile station. Here, the ringing tone control unit outputs the local ringing tone without outputting the NW-provided ringing tone even after the transition to the second radio access system if the voice communication control unit executes the continuation processing of the voice communication service during a period when the local ringing tone is being outputted without the NW-provided ringing tone outputted.

In the first or second feature of the present invention, the mobile station further includes an output state retention unit 109 (output state retention unit) configured to retain an output state indicating which one of the NW-provided ringing tone and the local ringing tone is being outputted. Here, the ringing tone control unit outputs the NW-provided ringing tone or the local ringing tone after the transition to the second radio access system, based on the output state retained by the output state retention unit, when the voice communication control unit executes the continuation processing of the voice communication service.

In the described feature, the output state retention unit may retain the output state based on data transmission information notified from the network via the first radio access system, the data transmission information indicating transmission of the NW-provided ringing tone.

In the described feature, the output state retention unit may retain the output state based on which one of the NW-provided ringing tone and the local ringing tone is being outputted by the ringing tone control unit.

In the described feature, the ringing tone control unit may receive the NW-provided ringing tone including at least any of normal incoming call alert, music, voice data and audio guidance.

A third feature of the present invention is summarized as a mobile communication method for executing a transition of a mobile station from a first radio access system with no circuit-switched domain to a second radio access system with a circuit-switched domain, the method being capable of providing a voice communication service via an IP multimedia subsystem, including the steps of: executing continuation processing of the voice communication service in the second radio access system if the mobile station makes a transition of a connection destination from the first radio access system to the second radio access system during an alert period when the other party in the voice communication service is being alerted; and outputting a NW-provided ringing tone or a local ringing tone during the alert period, the NW-provided ringing tone being transmitted from the network via the first radio access system or the second radio access system during the alert period, the local ringing tone being based on data stored in the mobile station. Here, the outputting step includes outputting the NW-provided ringing tone without outputting the local ringing tone based on the data stored in the mobile station after a transition to the second radio access system if the continuation processing of the voice communication service is executed during a period when the NW-provided ringing tone is being outputted.

A fourth feature of the present invention is summarized as a mobile communication method for executing a transition of a mobile station from a first radio access system with no circuit-switched domain to a second radio access system with a circuit-switched domain, the method being capable of providing a voice communication service via an IP multimedia subsystem, including the steps of: executing continuation processing of the voice communication service in the second radio access system if the mobile station makes a transition of a connection destination from the first radio access system to the second radio access system during an alert period when the other party in the voice communication service is being alerted; and outputting a NW-provided ringing tone or a local ringing tone during the alert period, the NW-provided ringing tone being transmitted from the network via the first radio access system or the second radio access system during the alert period and the local ringing tone being based on data stored in the mobile station. Here, the outputting step includes outputting the local ringing tone without outputting the NW-provided ringing tone even after a transition to the second radio access system if the continuation processing of the voice communication service is executed during a period when the local ringing tone is being outputted without the NW-provided ringing tone outputted.

As described above, the present invention naturally includes various embodiments which are not described herein. Accordingly, the technical scope of the invention should be determined only by the matters to define the invention in the scope of claims regarded as appropriate based on the description.

Note that the entire content of Japanese Patent Application No. 2012-197017 (filed on Sep. 7, 2012) is incorporated by reference in the present specification.

INDUSTRIAL APPLICABILITY

According to the feature of the present invention, a mobile station and a mobile communication method can be provided, which are capable of, even in a case of a transition made from LTE to 3G by aSRVCC, when being able to output a local ringing tone and a NW-provided ringing tone, continuing a ringing tone outputted before the transition.

EXPLANATION OF THE REFERENCE NUMERALS 10 mobile communication system
100A, 100B UE
101 transition processing unit
103 voice communication control unit
105 ringing tone control unit
107 ringing tone data storage unit
109 output state retention unit
111 signal output unit
200 IP-CAN
300 IMS
310 P-CSCF
320 S-CSCF
330 MRF

The invention claimed is:

1. A mobile station capable of providing a voice communication service via an IP multimedia subsystem and configured to execute a transition from a first radio access system with no circuit-switched domain to a second radio access system with a circuit-switched domain, comprising:
   a voice communication control circuit configured to execute continuation processing of the voice communication service in the second radio access system if the mobile station makes a transition of a connection destination from the first radio access system to the second radio access system during an alert period when the other party in the voice communication service is being alerted; and
   a ringing tone control circuit configured to output a NW-provided ringing tone or a local ringing tone during the alert period, the NW-provided ringing tone being transmitted from a network via the first radio access system or the second radio access system during the alert period, the local ringing tone being based on data stored in the mobile station,
   wherein the ringing tone control circuit outputs the NW-provided ringing tone based on that the NW-provided ringing tone is being outputted before the continuation processing of the voice communication service, without outputting the local ringing tone, after a transition to the second radio access system if the voice communication control unit circuit executes the continuation processing of the voice communication service during a period when the NW-provided ringing tone is being outputted.

2. The mobile station according to claim 1, further comprising:
   an output state retention circuit configured to retain an output state indicating which one of the NW-provided ringing tone and the local ringing tone is being outputted, wherein the ringing tone control circuit outputs the NW-provided ringing tone or the local ringing tone after the transition to the second radio access system, based on the output state retained by the output state retention circuit, when the voice communication control Unit circuit executes the continuation processing of the voice communication service.

3. The mobile station according to claim 2, wherein the output state retention circuit retains the output state based on data transmission information notified from the network via the first radio access system, the data transmission information indicating transmission of the NW-provided ringing tone.

4. The mobile station according to claim 2, wherein the output state retention circuit retains the output state based on which one of the NW-provided ringing tone and the local ringing tone is being outputted by the ringing tone control circuit.

5. The mobile station according to claim 1, wherein the ringing tone control circuit receives the NW-provided ringing tone including at least any of normal incoming call alert, music, voice data and audio guidance.

6. A mobile station capable of providing a voice communication service via an IP multimedia subsystem and configured to execute a transition from a first radio access system with no circuit-switched domain to a second radio access system with a circuit-switched domain, comprising:
 a voice communication control circuit configured to execute continuation processing of the voice communication service in the second radio access system if the mobile station makes a transition of a connection destination from the first radio access system to the second radio access system during an alert period when the other party in the voice communication service is being alerted; and
 a ringing tone control circuit configured to output a NW-provided ringing tone or a local ringing tone during the alert period, the NW-provided ringing tone being transmitted from the network via the first radio access system or the second radio access system during the alert period, the local ringing tone being based on data stored in the mobile station,
 wherein the ringing tone control circuit outputs the local ringing tone based on that the local ringing tone is being outputted before the continuation processing of the voice communication service even after the transition to the second radio access system if the voice communication control circuit executes the continuation processing of the voice communication service during a period when the local ringing tone is being outputted without the NW-provided ringing tone outputted.

7. The mobile station according to claim 6, further comprising:
 an output state retention circuit configured to retain an output state indicating which one of the NW-provided ringing tone and the local ringing tone is being outputted,
 wherein the ringing tone control circuit outputs the NW-provided ringing tone or the local ringing tone after the transition to the second radio access system, based on the output state retained by the output state retention circuit, when the voice communication control circuit executes the continuation processing of the voice communication service.

8. The mobile station according to claim 6, wherein the ringing tone control circuit receives the NW-provided ringing tone including at least any of normal incoming call alert, music, voice data and audio guidance.

9. A mobile communication method for executing a transition of a mobile station from a first radio access system with no circuit-switched domain to a second radio access system with a circuit-switched domain, the method being capable of providing a voice communication service via an IP multimedia subsystem, comprising the steps of:
 executing continuation processing of the voice communication service in the second radio access system if the mobile station makes a transition of a connection destination from the first radio access system to the second radio access system during an alert period when the other party in the voice communication service is being alerted; and
 outputting a NW-provided ringing tone or a local ringing tone during the alert period, the NW-provided ringing tone being transmitted from the network via the first radio access system or the second radio access system during the alert period, the local ringing tone being based on data stored in the mobile station,
 wherein the outputting step includes outputting the NW-provided ringing tone based on that the NW-provided ringing tone is being outputted before the continuation processing of the voice communication service, without outputting the local ringing tone, after a transition to the second radio access system if the continuation processing of the voice communication service is executed during a period when the NW-provided ringing tone is being outputted.

10. A mobile communication method for executing a transition of a mobile station from a first radio access system with no circuit-switched domain to a second radio access system with a circuit-switched domain, the method being capable of providing a voice communication service via an IP multimedia subsystem, comprising the steps of:
 executing continuation processing of the voice communication service in the second radio access system if the mobile station makes a transition of a connection destination from the first radio access system to the second radio access system during an alert period when the other party in the voice communication service is being alerted; and
 outputting a NW-provided ringing tone or a local ringing tone during the alert period, the NW-provided ringing tone being transmitted from the network via the first radio access system or the second radio access system during the alert period and the local ringing tone being based on data stored in the mobile station,
 wherein the outputting step includes outputting the local ringing tone based on that the local ringing tone is being outputted before the continuation processing of the voice communication service even after a transition to the second radio access system if the continuation processing of the voice communication service is executed during a period when the local ringing tone is being outputted without the NW-provided ringing tone outputted.

* * * * *